(12) United States Patent
Chaplin et al.

(10) Patent No.: US 12,110,966 B2
(45) Date of Patent: Oct. 8, 2024

(54) SELF-RETAINING LIP SEAL

(71) Applicant: AKTIEBOLAGET SKF, Gothenburg (SE)

(72) Inventors: Raymond Lee Chaplin, Draper, UT (US); Mark K Zitting, Draper, UT (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 18/109,336

(22) Filed: Feb. 14, 2023

(65) Prior Publication Data
US 2024/0271701 A1  Aug. 15, 2024

(51) Int. Cl.
*F16J 15/3204* (2016.01)
(52) U.S. Cl.
CPC .................. *F16J 15/3204* (2013.01)
(58) Field of Classification Search
CPC .......... F16J 15/00; F16J 15/32; F16J 15/3204; F16J 15/3208; F16J 15/3216; F16J 15/322; F16J 15/3224; F16J 15/3232; F16J 15/3236
USPC ....................................................... 277/549
See application file for complete search history.

(56) References Cited

U.S. PATENT DOCUMENTS

| 3,995,868 | A | 12/1976 | Smith | |
|---|---|---|---|---|
| 5,209,502 | A | 5/1993 | Savoia | |
| 5,833,245 | A * | 11/1998 | Gallagher | F16J 15/3236 277/909 |
| 6,079,715 | A | 6/2000 | Johnen et al. | |
| 6,688,603 | B2 | 2/2004 | vom Schemm | |
| 7,040,628 | B2 | 5/2006 | Boyers | |
| 7,055,828 | B2 * | 6/2006 | Hatch | F16J 15/3228 277/351 |
| 11,118,685 | B2 | 9/2021 | Tanner et al. | |
| 11,131,385 | B2 | 9/2021 | Zitting et al. | |
| 2004/0012156 | A1 * | 1/2004 | Cobb | F16J 15/3236 277/602 |
| 2009/0146379 | A1 * | 6/2009 | Foster | F16J 15/3236 277/307 |
| 2021/0364088 | A1 * | 11/2021 | Pecak | F16J 15/324 |

* cited by examiner

*Primary Examiner* — Nathan Cumar
(74) *Attorney, Agent, or Firm* — J-TEK LAW PLLC; Scott T. Wakeman; Mark A. Ussai (57) ABSTRACT

A mechanical assembly includes a shaft having a central axis and an outer member having a bore disposed about the shaft, either the shaft or the outer member having a gland defined by a circumferential surface and at least one radial surface and the other one of the shaft and the outer member being angularly displaceable about the central axis. A seal has an annular body disposed within the gland and is formed of an flexible material, preferably a plastic or elastomeric material, the annular body having a main body portion with inner and outer radial ends. An inner sealing lip extends radially inwardly from the inner end of the main body portion and is configured to engage with the shaft. An outer sealing lip extends radially outwardly from the outer radial end of the main body portion and is configured to engage with the outer member.

19 Claims, 7 Drawing Sheets

SELF-RETAINING LIP SEAL

BACKGROUND OF THE INVENTION

The present invention relates to seals, and more particularly to PTFE rotary lip seals.

Seals formed of polytetrafluoroethylene ("PTFE") or similar plastics and having one or more lips for sealing between a rotary shaft and a static outer member, or vice versa, are generally known. Typically, PTFE lip seals include a PTFE seal body disposed within an outer metal case, the case enabling the seal body to be retained within a gland in the outer member or in the shaft. In certain seal products, the metal case is replaced with another component for retaining the seal body, such as for example, an O-ring disposed within an annular groove formed into an outer surface of the seal body.

SUMMARY OF THE INVENTION

In one aspect, the present invention is a mechanical assembly comprising a shaft having a central axis and an outer member having a bore disposed about the shaft. Either the shaft or the outer member has a gland defined by a circumferential surface and at least one radial surface and the other one of the shaft and the outer member is angularly displaceable about the central axis. A seal has an annular body disposed within the gland and is formed of a flexible material, the annular body having a main body portion with inner and outer radial ends. An inner sealing lip extends radially inwardly from the inner radial end of the main body portion and is configured to engage with the shaft. An outer sealing lip extends radially outwardly from the outer radial end of the main body portion and is configured to engage with the outer member.

In another aspect, the present invention is a seal for sealing between a shaft and an outer member, the shaft being rotatable about a central axis and the outer member having a gland defined by an inner circumferential surface and at least one radial surface. The seal comprises an annular body sized to be disposable within the gland and formed of a flexible material, the annular body having a main body portion. A sealing lip extends radially inwardly from the main body portion and is configured to sealingly engage with the shaft. A retainer lip extends radially-outwardly from the main body portion and is configured to engage with the inner circumferential surface of the outer member so as to retain the annular body within the gland.

In yet another aspect, the present invention is again a seal for sealing between a shaft and an outer member, the outer member being rotatable about a central axis extending through the shaft and having a bore. The shaft is disposed within the outer member bore and has an outer circumferential surface and a gland defined by two facing radial surfaces and a circumferential surface spaced radially inwardly from the outer circumferential surface. The seal comprises an annular body sized to be disposable within the gland and formed of a flexible material, the annular body having a main body portion. A primary sealing lip extends radially outwardly from the main body portion and is configured to sealingly engage with the outer member. A secondary sealing lip extends radially inwardly from the main body portion and is configured to engage with the circumferential surface of the gland.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-9 a mechanical assembly 10 basically comprising a shaft 12 having an outer circumferential surface 12a and a central axis $A_C$ and an outer member 14 having an inner circumferential surface 14a defining a bore 15, the shaft 12 being disposed within the outer member bore 15, and a seal 16. Either the shaft 12 or the outer member 14, which may be a housing, a hub or other appropriate mechanical component, is angularly displaceable about the central axis $A_C$ (i.e., either rotatably or oscillatory). The other or "static" one of the shaft 12 and the outer member 14 has a gland 18 including a circumferential surface 20 and at least one radial surface 22, the gland 18 being configured to receive the seal 16.

The seal 16 basically comprises an annular body 30 disposed within the gland 18 and formed of a flexible material, preferably a plastic or elastomeric material and most preferably polytetrafluoroethylene ("PTFE"), but may be any other appropriate elastomeric or polymeric material or even a non-polymeric material. The annular body 30 includes a main body portion 32 with inner and outer radial ends 32a, 32b, respectively, and first and second axial ends 32c, 32d, respectively. An inner sealing lip 34 is preferably formed as a plate-like ring extending radially inwardly from the inner radial end 32a of the main body portion 32 and is configured to engage with the shaft 12. Further, an outer sealing lip 36 is also formed as a plate-like ring, extends radially outwardly from the outer radial end 32b of the main body portion 32 and is configured to engage with the outer member 14.

In a first construction of the mechanical assembly 10 shown in FIGS. 1-5, the gland 18 is formed in the outer member 14 and the shaft 12 is angularly displaceable about the central axis $A_C$. In the first construction, the inner sealing lip 34 is configured to sealingly engage with the outer circumferential surface 12a of the angularly displaceable shaft 12 and the outer or "retainer" sealing lip 36 is configured to engage with the circumferential surface 20 of the gland 18 so as to retain the annular body 30 disposed within the gland 18, as described in greater detail below. In a second construction of the mechanical assembly 10 depicted in FIGS. 6-9, the gland 18 is formed in the shaft 12 and the outer member 14 is angularly displaceable about the central axis $A_C$. With the second construction, the inner sealing lip 34 is a "secondary" sealing lip configured to sealingly engage with the circumferential surface 20 of the gland 18 and the outer sealing lip 36 is a "primary" sealing lip configured to sealingly engage with the inner circumferential surface 14a of the angularly displaceable outer member 14.

Figure 6:
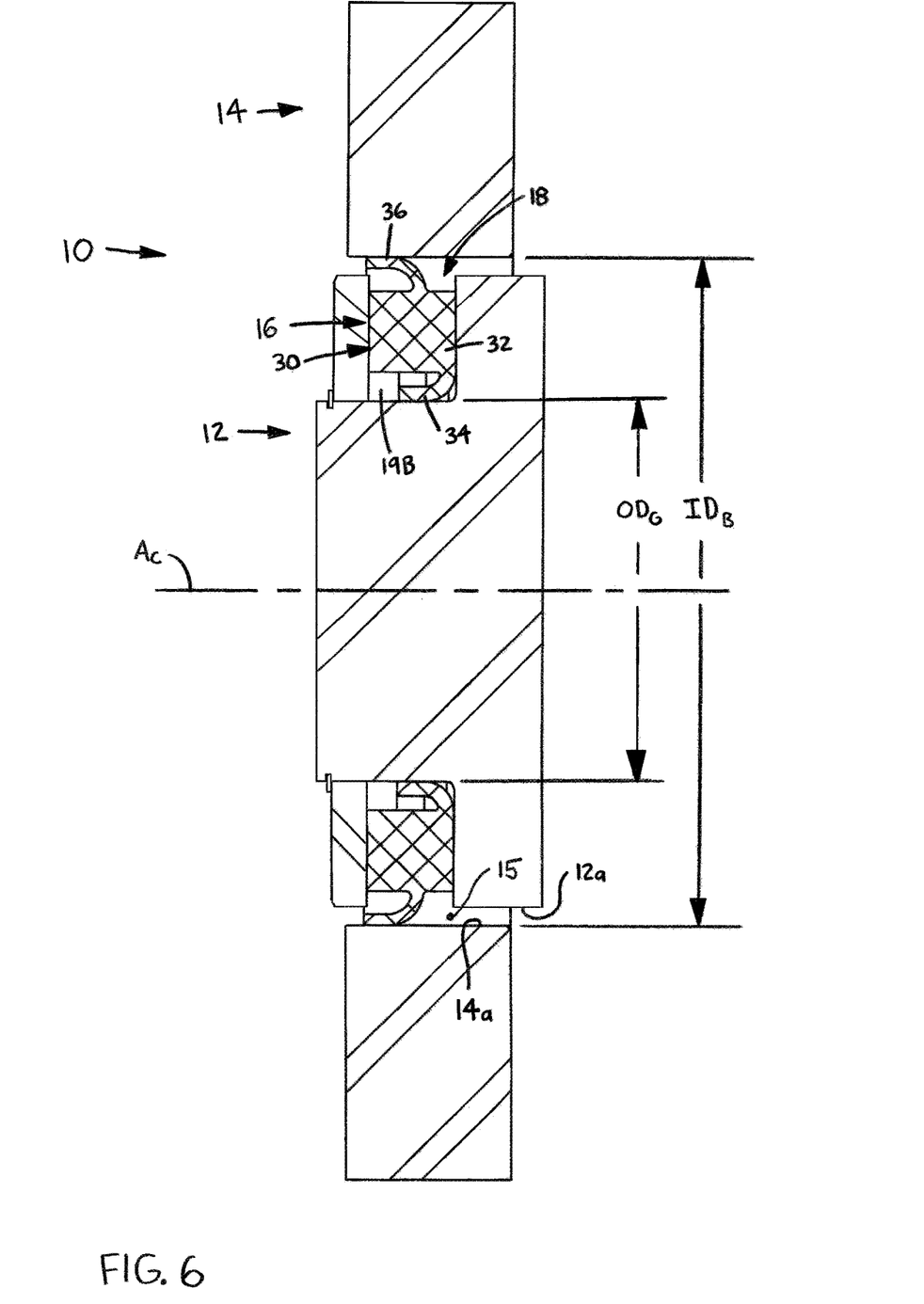
FIG. 6 is an axial cross-sectional view of a mechanical assembly and a seal in accordance with a second construction of the present invention.

In either construction, the seal 16 is formed or configured to be "self-retaining" within the gland 18 by either engagement of the outer sealing lip 36 in the outer gland 19A or the sizing of the annular body 30 disposed within the inner gland 19B. That is, in particular with the first construction of the mechanical assembly 10, the seal 16 is retained within the gland 18 primarily by friction generated by the pressure exerted by the outer, retainer lip 36 against the gland circumferential surface 20, thus eliminating the need for a separate retainer element as with previously known seals. In the second construction, the seal annular body 30 has an inside diameter $ID_B$ that it less than the outside diameter ODs of the shaft 12 and is thereby retained within the inner gland 19B by axial interference with the gland radial surfaces 22. Preferably, the shaft 12 is of two-piece construction to permit installation of the seal 16 into the gland 19B, as depicted in FIG. 6. In either construction, the seal 16 may also be formed relatively narrower, i.e. with a lesser width or thickness between the axial ends 32c, 32d, than previous seals which required a separate casing element or sufficient width to form a groove for a separate O-ring retainer. Having described the basic elements and functions above, these and other components of the present mechanical assembly 10 including the improved seal 16 are described in greater detail below.

Referring again to FIGS. 1-5, as discussed above, in the first construction of the mechanical assembly 10, the gland 18 is an outer gland 19A formed in the outer member 14, which has opposing first and second axial end 14b, 14c and a circular opening 17 extending into the outer gland 19A from the first axial end 14b. Preferably, a retention shoulder 21 extends radially inwardly adjacent to the axial end 14b and is preferably annular so as to extend circumferentially entirely about the central axis $A_C$. However, the shoulder 21 may be formed as two or more arcuate sections spaced circumferentially about the central axis $A_C$. In either case, the gland circumferential surface 20 extends axially between the radial surface 22 and the retention shoulder 21 and the gland 18 only has a single radial surface 22 facing the opening 17.

Further, the main body portion 32 of the seal annular body 30 is sized to fit around the shaft 12 with radial clearance (not indicated) and is installed within the outer member gland 19A such that the first axial end 32c of the main body portion 32 is disposed against the gland radial surface 22. A section 36c of the outer sealing lip 36 of the seal annular body 30 is disposed against the outer circumferential surface 20 of the gland 18 such that the retention shoulder 21 is contactable by the outer radial end 36b of the outer sealing lip 36 to retain the seal annular body within the gland 18. However, the seal 16 may be retained within the outer gland 19A solely by friction between the seal outer lip 36 and the gland circumferential surface 22, such that the outer member 14 may be formed without the retention shoulder 21.

Figure 1:
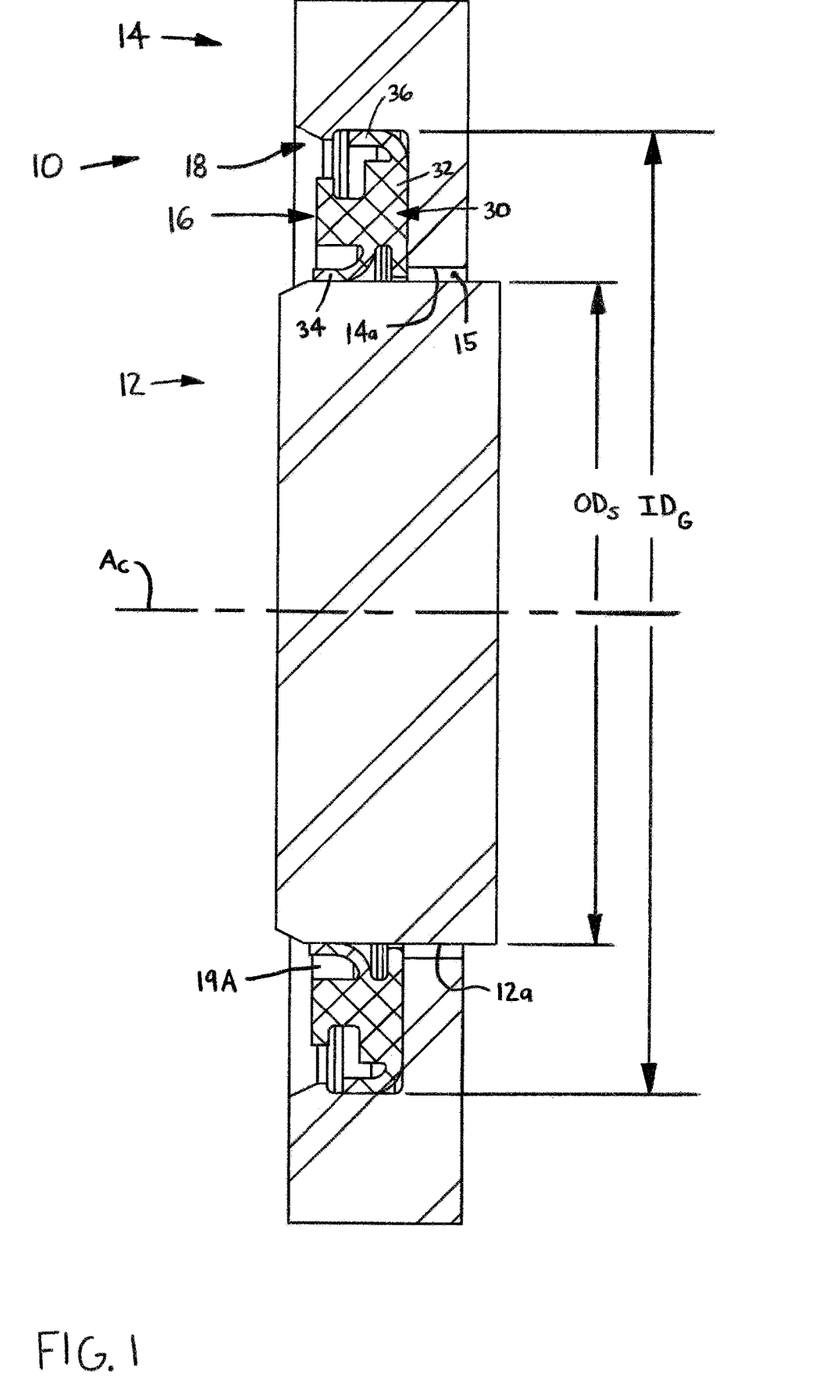
FIG. 1 is an axial cross-sectional view of a mechanical assembly and a seal in accordance with a first construction of the present invention.
Figure 2:
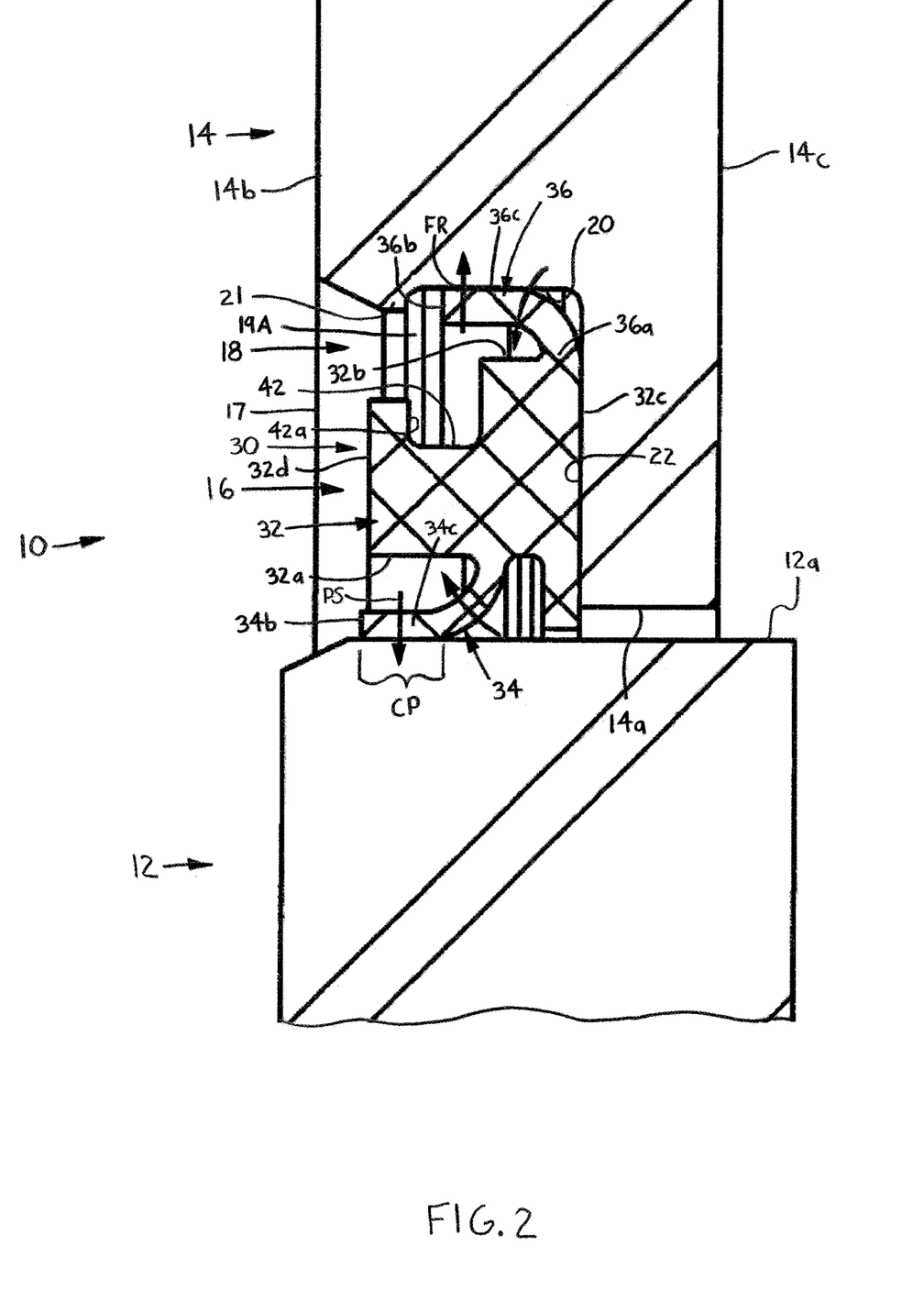
FIG. 2 is a broken-away, enlarged view of an upper portion of FIG. 1.
Figure 3:
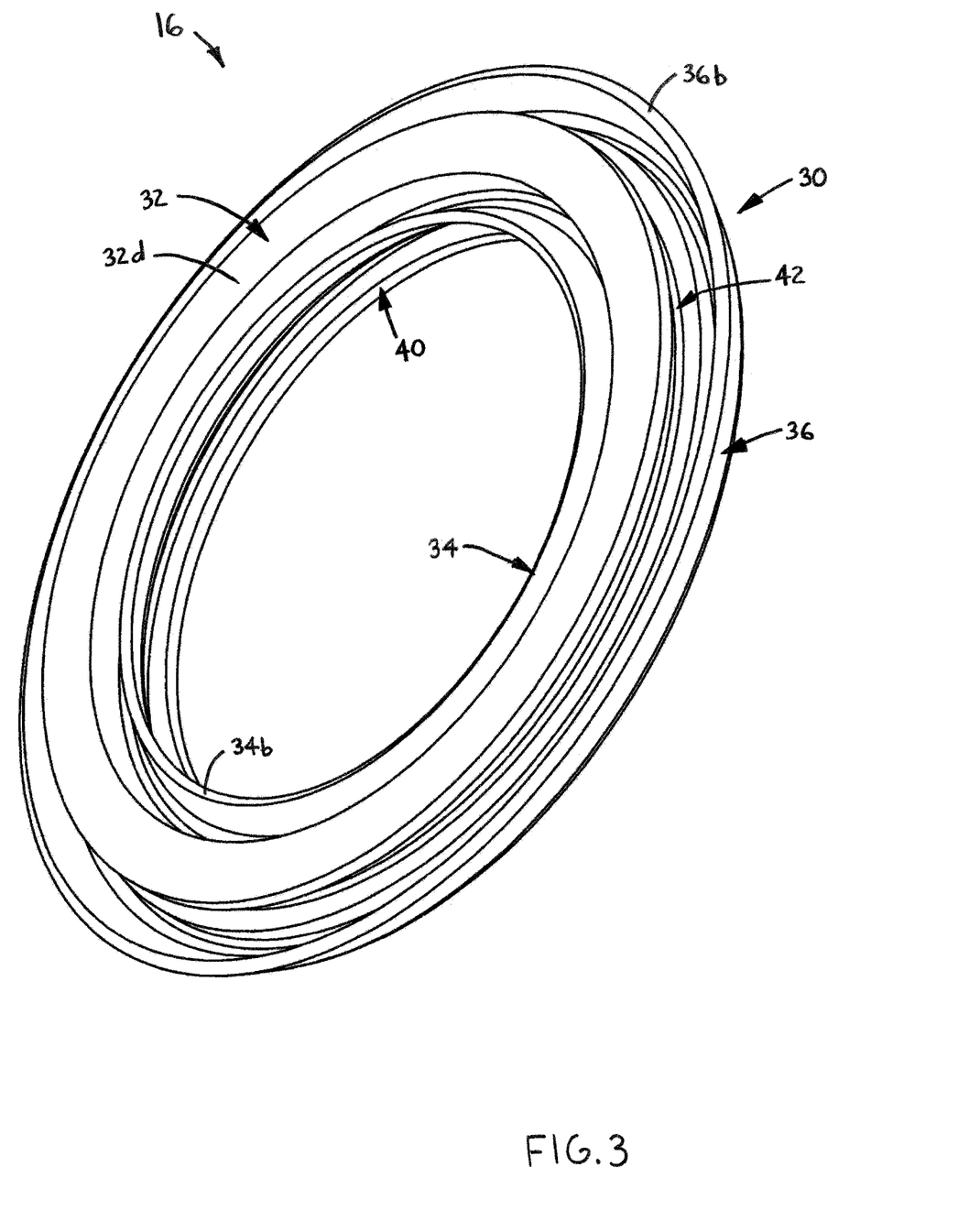
FIG. 3 is a perspective view of the first construction seal.
Figure 4:
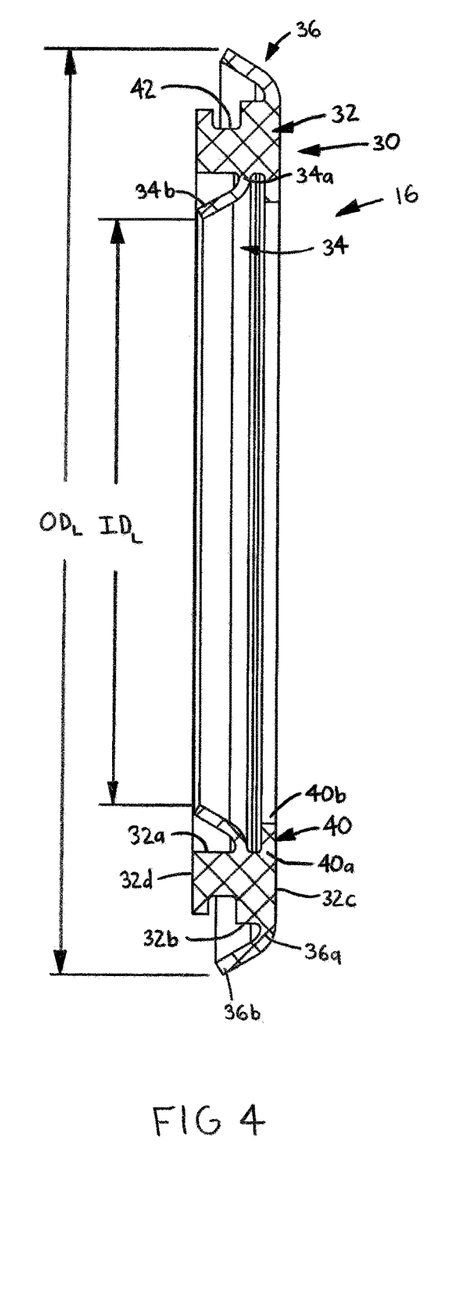
FIG. 4 is an axial cross-sectional view of the first construction seal, shown with sealing lips being preformed to extend in a desired axial direction.
Figure 5:
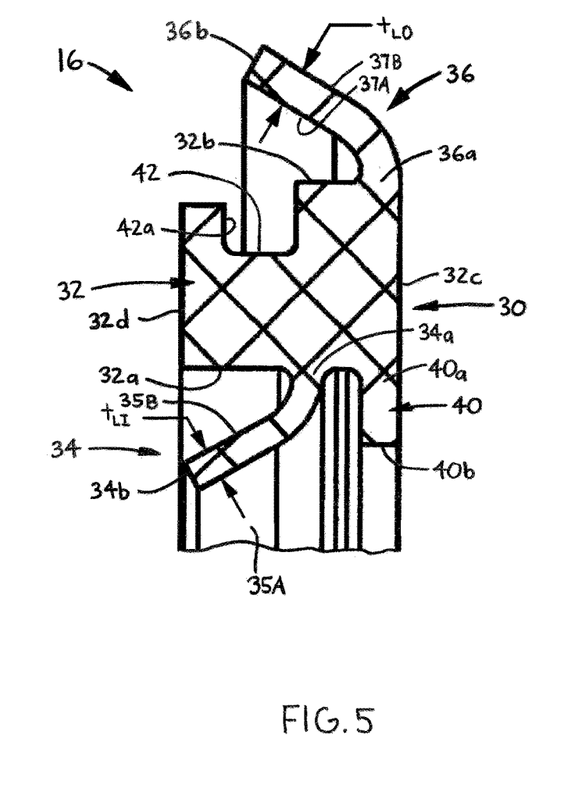
FIG. 5 is a broken-away, enlarged view of an upper portion of FIG. 4.

Furthermore, the inner sealing lip 34 is configured to deflect radially outwardly and axially toward the second axial end 32d of the main body portion 32 when the seal 16 is installed about the shaft 12. More specifically, the inner sealing lip 34 has an outer radial end 34a integrally formed with the inner radial end 32a of the seal main body portion 32, preferably being located generally centrally on the inner end 32a, an opposing, free inner radial end 34b, first and second circumferential surfaces 35A, 35B and a thickness $t_{L1}$ between the circumferential surfaces 35A, 35B which is generally constant between the two ends 34a, 34b. As indicated in FIG. 4, the inner radial end 34b of the inner lip 34 has an inside diameter $ID_L$, which has a value less than a value of the outside diameter $OD_S$ (FIG. 1) of the shaft 12 when the seal body 30 is in an "uninstalled state", i.e., separate from the remainder of the mechanical assembly 10. As such, the inner sealing lip 34 deflects radially outwardly about the sealing lip outer radial end 34a during installation about the shaft 12, as indicated by an arrow in FIG. 2, and exerts sealing pressure PS against the shaft outer surface 12a. Further, the inner sealing lip 34 has a contact section 34c extending from the inner radial end 34b toward the outer radial end 34a and defining a cylindrical contact patch CP on the shaft outer circumferential surface 12a, which can be varied by increasing or decreasing the length (not indicated) between the ends 34a, 34b, with a corresponding increase or decrease in sealing pressure PS.

Still referring to FIGS. 1-5, the outer sealing lip 36 is configured to deflect radially inwardly and axially toward the second axial end 32d of the main body portion 32 when the seal 16 is installed within the gland 18. More specifically, the outer lip 36 has an inner radial end 36a integrally formed with the outer radial end 32b of the seal main body portion 32, preferably adjacent to the body first axial end 32c, an opposing, free outer radial end 36b, first and second circumferential surfaces 37A, 37B and a thickness $t_{LO}$ (FIG. 5) between the circumferential surfaces 37A, 37B which is generally constant between the two ends 36a, 36b. The outer lip 36 has an outside diameter $OD_L$ (FIG. 4) at the outer end 36b with a value greater than a value of the inside diameter $ID_G$ (FIG. 1) of the gland inner circumferential surface 20 when the seal body 30 is in an uninstalled state, separate from the gland 18, as depicted in FIG. 4. As such, the outer sealing lip 36 deflects radially inwardly about the outer sealing lip inner radial end 36a during installation within the gland 18, as indicated by an arrow in FIG. 2, and exerts a retention force FR radially outwardly against the gland inner circumferential surface 20.

Preferably, the seal 16 of the first construction further includes a shoulder 40 extending radially inwardly from the inner radial end 32a of the main body portion 32 and disposed axially between the inner sealing lip 34 and the first axial end 32a of the main body portion 32. The shoulder 40 has an outer radial end 40a integrally formed with the main body portion 32 and an inner radial end 40b configured to be disposed proximal to and spaced radially outwardly from the shaft 12. With this structure the shoulder 40 functions to maintain the seal 16 generally centered about the central axis $A_C$, specifically when there is any radial offset between the shaft 12 and the bore 15 of the outer member 14. Preferably, the shoulder 21 is annular and extends entirely circumferentially about the central axis $A_C$, but may be formed as two or more arcuate sections or in any other appropriate manner.

Further, the seal 16 of the first construction mechanical assembly 10 preferably has a notch 42 extending radially inwardly from the outer radial end 32b of the main body portion 32 and configured to be engaged by a removal tool (not shown) for exerting a pulling force to remove the seal 16 from the gland 18. The notch 42 may be formed as a single cavity of any appropriate shape, one or more arcuate groove sections, a single annular groove or any appropriate shape and functions to merely provide a radial surface 42a against which a portion of the tool may be disposed as the tool pulls the seal 16 in a generally axial direction.

Referring to FIGS. 6-9, as discussed above, in the second construction mechanical assembly 10, the gland 18 is an inner gland 19B formed in the shaft 12. Specifically, the inner gland 19A includes first and second facing radial surfaces 23A, 23B extending radially inwardly from the shaft outer circumferential surface 12a and the circumferential surface 20 of the gland 18 is an outer circumferential surface which extends axially between the first and second radial surfaces 23A, 23B and is spaced radially inwardly from the shaft outer surface 12a. In this construction, the inner sealing lip 34 is configured to sealingly engage with the circumferential surface 20 of the gland 18 and the outer sealing lip 36 is configured to sealingly engage with the inner circumferential surface 14a of the outer member 14, as described in further detail below.

Specifically, the first axial end 32c of the main body portion 32 is disposed against the first radial surface 23A of the inner gland 19B and the second axial end 32b is preferably spaced axially from, but may be disposed against (as depicted), the gland second radial surface 23B. The inner sealing lip 34 is configured to deflect radially outwardly and axially toward the second axial end 32b of the main body portion 32 so as to sealingly engage with the gland circumferential surface 20 when the seal 16 is installed within the gland 19B. More specifically, the seal inner lip 34 has an outer radial end 34a integrally formed with the body inner radial end 32a, preferably adjacent to the first axial end 32c, an opposing, free inner radial end 34b, opposing first and second circumferential surfaces 35A, 35B and a thickness between the circumferential surfaces 35A, 35B which is generally constant between the two ends 34a, 34b.

Figure 8:
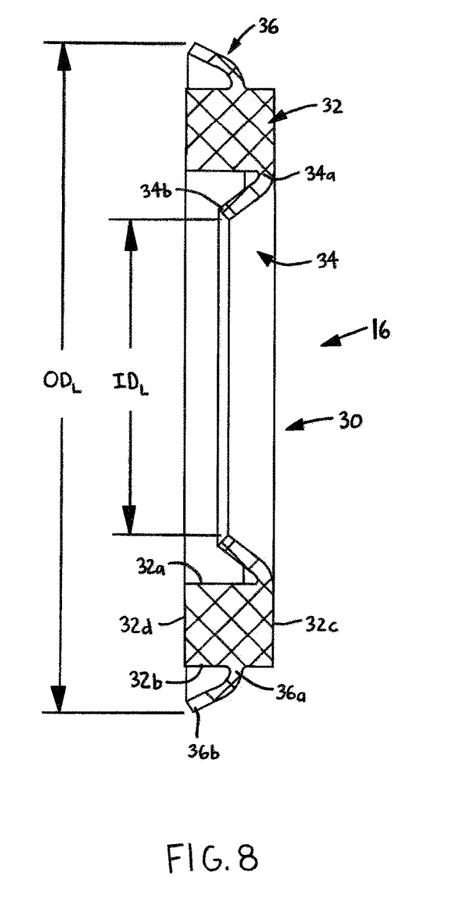
FIG. 8 is an axial cross-sectional view of the second construction seal, shown with sealing lips being preformed to extend in a desired axial direction.
Figure 9:
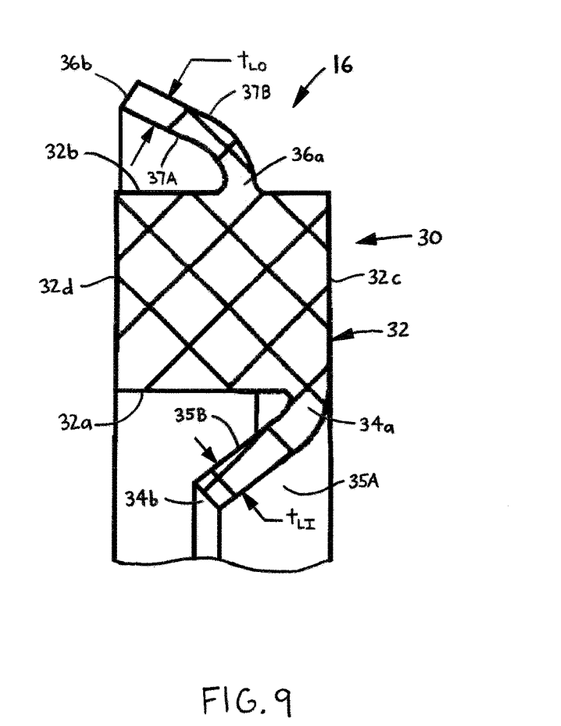
FIG. 9 is a broken-away, enlarged view of an upper portion of FIG. 8.

As indicated in FIG. 8, the inner radial end 34b has an inside diameter $ID_L$ with a value less than a value of the outside diameter ODG (FIG. 6) of the gland circumferential surface 20 when the seal body 30 is in an uninstalled state or separate from the shaft 12. With this structure, the inner sealing lip 34 deflects radially outwardly about the sealing lip outer radial end 34a during installation into the gland 19B, as indicated by an arrow, and exerts sealing pressure PS against the gland circumferential surface 20. Further, the inner sealing lip 34 has a contact section 34c extending from the inner radial end 34b toward the outer radial end 34a and defining a cylindrical contact patch CPI on the gland circumferential surface 20.

Figure 7:
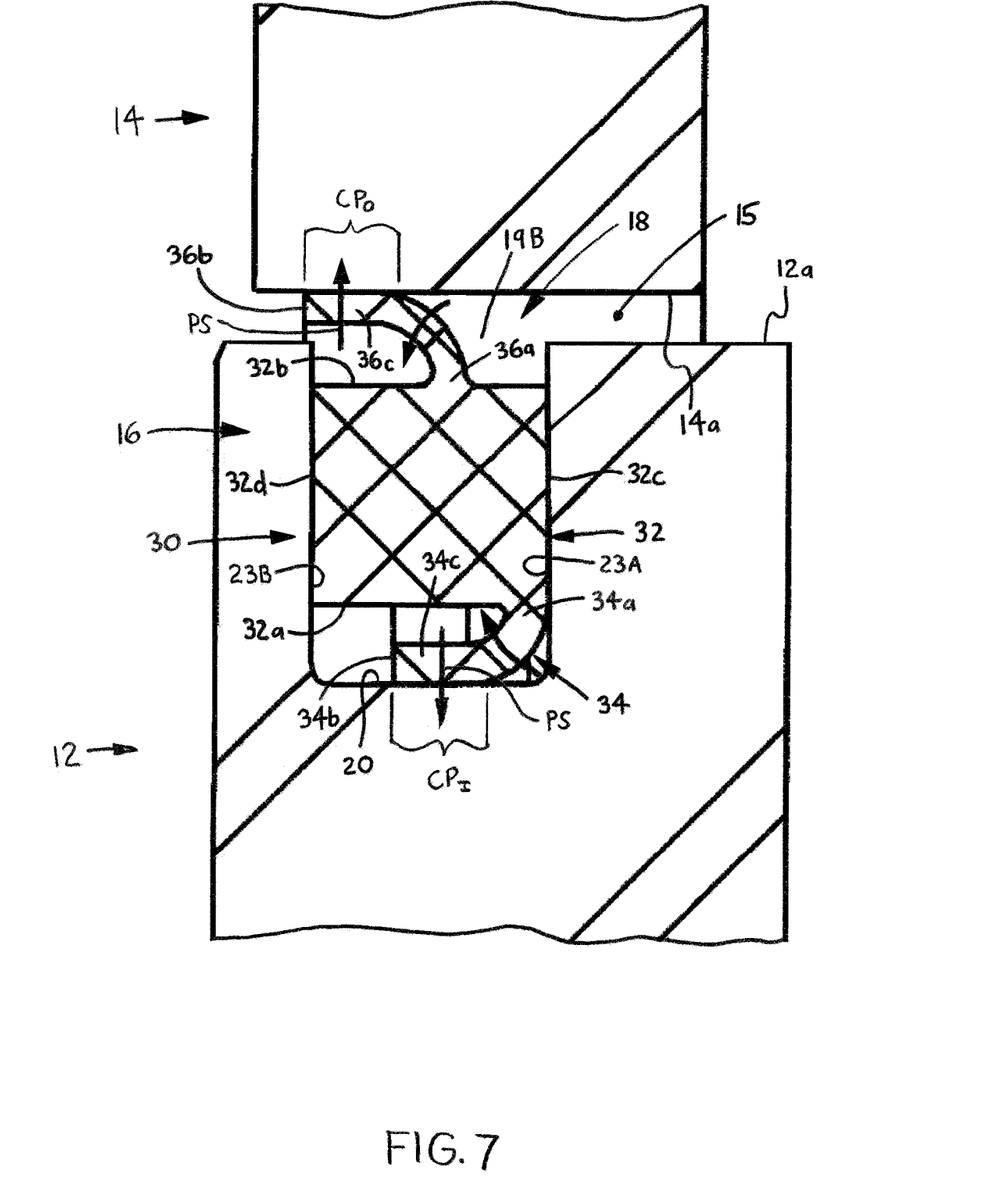
FIG. 7 is a broken-away, enlarged axial cross-sectional view of the second construction mechanical assembly.

Still referring to FIGS. 6-9, the outer sealing lip 36 is configured to deflect radially inwardly and axially toward the second axial end 32d of the main body portion 32 when the outer sealing lip 36 engages with the inner circumferential surface 14a of the outer member 14, as indicated by an arrow in FIG. 7. Specifically, the outer sealing lip 36 has an inner radial end 36a integrally formed with the seal main body portion 32, preferably generally centrally on the body outer radial end 32b, an opposing, free outer radial end 36b, opposing first and second circumferential surfaces 37A, 37B, respectively, and a thickness $t_{LO}$ between the circumferential surfaces 37A, 37B which is generally constant between the two ends 36a, 36b. The outer sealing lip 36 has an outside diameter $OD_L$ (FIG. 8) at the outer radial end 36b which is greater than an inside diameter $ID_B$ (FIG. 6) of the outer member bore 15 when the seal 16 is in the uninstalled state, or at least separate from the outer member 14.

As such, the outer sealing lip 36 deflects radially inwardly about the sealing lip inner radial end 36a during installation within the outer member 14 and exerts sealing pressure PS against the outer member 14. Further, the outer sealing lip 36 has a contact section 36c extending from the outer radial end 36b toward the inner radial end 36a and defining a cylindrical contact patch $CP_O$ on the outer member inner circumferential surface 14a, as indicated in FIG. 7. As with the primary sealing lip 34 in the first construction, the contact patch $CP_O$ and the sealing pressure PS can be increased by increasing the length (not indicated) between the sealing lip ends 36a, 36b, and alternatively each is correspondingly decreased with a decrease in seal lip length.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A mechanical assembly comprising:
    a shaft having a central axis;
    an outer member having a bore disposed about the shaft, one of the shaft and the outer member having a gland defined by a circumferential surface and at least one radial surface and the other one of the shaft and the outer member being angularly displaceable about the central axis; and a seal having an annular body disposed within the gland and formed of a flexible material, the annular body having a main body portion with inner and outer radial ends, an inner sealing lip extending radially inwardly from the inner radial end of the main body portion so as to be spaced radially inwardly from and extending axially across an inner circumferential surface on the inner radial end of the main body portion and configured to engage with the shaft and an outer sealing lip extending radially outwardly from the outer radial end of the main body portion so as to be spaced radially outwardly from and extending axially across an outer circumferential surface on the outer radial end of the main body portion and configured to engage with the outer member.

2. The mechanical assembly as recited in claim 1, wherein:

the gland is formed in the outer member;

the shaft has an outer circumferential surface and is angularly displaceable about the central axis; and the inner sealing lip is configured to sealingly engage with the outer circumferential surface of the shaft and the outer sealing lip is configured to engage with the circumferential surface of the gland so as to retain the annular body disposed within the gland.

3. The mechanical assembly as recited in claim 2, wherein:

the main body portion of the seal annular body is sized to fit around the shaft and further has opposing first and second axial ends, the first axial end being disposed against the gland radial surface when the seal is installed within the gland;

the inner sealing lip is configured to deflect radially outwardly and axially toward the second axial end of the main body portion when the seal is installed about the shaft; and the outer sealing lip is configured to deflect radially inwardly and axially toward the second axial end of the main body portion when the seal is installed within the gland.

4. The mechanical assembly as recited in claim 2, wherein the inner sealing lip has an outer radial end integrally formed with the seal main body portion and an inner radial end, the inner sealing lip having an inside diameter at the inner radial end less than an outside diameter of the shaft such that the inner sealing lip deflects radially outwardly about the sealing lip outer radial end during installation about the shaft and exerts sealing pressure against the shaft.

5. The mechanical assembly as recited in claim 4, wherein the inner sealing lip has a contact section extending from the inner radial end toward the outer radial end and defining a cylindrical contact patch on the shaft outer circumferential surface.

6. The mechanical assembly as recited in claim 2, wherein the seal main body portion has opposing first and second axial ends, the first axial end being disposed against the gland radial surface and the inner and outer radial ends extending between the first and second axial ends, the seal further including a shoulder extending radially inwardly from the inner radial end of the main body portion and disposed axially between the inner sealing lip and the first axial end, the shoulder having an inner radial end configured to be disposed proximal to and spaced radially outwardly from the shaft.

7. The mechanical assembly as recited in claim 2, wherein the outer sealing lip has an inner radial end integrally formed with the seal main body portion, an outer radial end and an outside diameter at the outer radial end of the outer sealing lip greater than an inside diameter of the gland inner circumferential surface when the seal body is in an uninstalled state such that the outer sealing lip deflects radially inwardly about the outer sealing lip inner radial end during installation within the gland and exerts a retention force radially outwardly against the gland inner circumferential surface.

8. The mechanical assembly as recited in claim 7, wherein:

the outer member has an axial end with a circular opening extending into the gland and a retention shoulder extending radially inwardly adjacent to the axial end, the gland circumferential surface extending axially between the gland radial surface and the retention shoulder; and a section of the outer sealing lip of the seal annular body is disposed against the inner circumferential surface of the gland such that the retention shoulder is contactable by the outer radial end of the outer sealing lip to retain the seal annular body within the gland.

9. The mechanical assembly as recited in claim 2 wherein the seal main body portion further has a notch extending radially inwardly from the outer radial end of the main body portion and configured to be engaged by a tool for exerting a pulling force to remove the seal from the gland.

10. The mechanical assembly as recited in claim 2, wherein:

the shaft has an outer circumferential surface and the gland is formed in the shaft, the at least one radial surface of the gland including first and second facing radial surfaces extending radially inward from the shaft outer circumferential surface and the circumferential surface of the gland extending axially between the first and second radial surfaces and spaced radially inwardly from the shaft outer circumferential surface;

the outer member has an inner circumferential surface defining the bore and is angularly displaceable about the central axis; and the inner sealing lip is configured to sealingly engage with the circumferential surface of the gland and the outer sealing lip is configured to sealingly engage with the inner circumferential surface of the outer member.

11. The mechanical assembly as recited in claim 10, wherein:

the seal main body portion further has opposing first and second axial ends, the first axial end being disposed against the first radial surface of the gland;

the inner sealing lip is configured to deflect radially inwardly and axially toward the second axial end of the main body portion so as to sealingly engage with the gland circumferential surface when the seal is installed within the gland; and the outer sealing lip is configured to deflect radially outwardly and axially toward the second axial end of the main body portion when the outer sealing lip engages with the inner circumferential surface of the outer member.

12. The mechanical assembly as recited in claim 10, wherein the outer sealing lip has an inner radial end integrally formed with the seal main body portion and an outer radial end, the outer sealing lip having an outside diameter at the outer radial end of the outer sealing lip greater than an inside diameter of the outer member bore when the seal body is in an uninstalled state such that the outer sealing lip deflects radially inwardly about the sealing lip inner radial end during installation within the outer member and exerts sealing pressure against the outer member.

13. The mechanical assembly as recited in claim 12, wherein the outer sealing lip has a contact section extending from the outer radial end toward the inner radial end and defining a cylindrical contact patch on the inner circumferential surface of the outer member.

14. The mechanical assembly as recited in claim 10, wherein the inner sealing lip has an outer radial end integrally formed with the seal main body portion, an inner radial end and an inside diameter at the inner radial end less than an outside diameter of the gland circumferential surface such that the inner sealing lip deflects radially outwardly about the inner lip outer radial end during installation within the gland and exerts a sealing force radially inwardly against the gland circumferential surface.

15. A seal for sealing between a shaft and an outer member, the shaft being rotatable about a central axis and the outer member having a gland defined by an inner circumferential surface and at least one radial surface, the seal comprising:
an annular body sized to be disposable within the gland and formed of a flexible material, the annular body having a main body portion, a sealing lip extending radially inwardly from the main body portion and configured to sealingly engage with the shaft and a retainer lip extending radially-outwardly from the main body portion and configured to engage with the inner circumferential surface of the outer member so as to retain the annular body within the gland;
wherein the seal main body portion has opposing first and second axial ends, the first axial end being disposed against the gland radial surface, the seal further including a shoulder extending radially inwardly from the inner circumferential surface of the main body portion and disposed axially between the sealing lip and the first axial end, the shoulder having an inner radial end configured to be disposed proximal to and spaced radially outwardly from the shaft.

16. The seal as recited in claim 15, wherein:
the main body portion of the seal annular body is sized to fit around the shaft and further has opposing first and second axial ends, the first axial end being disposed against the gland radial surface when the seal is installed within the gland;
the sealing lip is configured to deflect radially outwardly and axially toward the second axial end of the main body portion when the seal is installed about the shaft; and
the retainer lip is configured to deflect radially inwardly and axially toward the second axial end of the main body portion when the seal is installed within the gland.

17. The seal as recited in claim 15, wherein:
the sealing lip has an outer radial end integrally formed with the seal main body portion and an inner radial end, the inner sealing lip having an inside diameter at the inner radial end lesser than an outside diameter of the shaft such that the sealing lip deflects radially outwardly about the sealing lip outer radial end during installation about the shaft and exerts sealing pressure against the shaft; and
the retainer lip has an inner radial end integrally formed with the seal main body portion, an outer radial end and an outside diameter at the outer radial end greater than an inside diameter of the gland inner circumferential surface such that the retainer lip deflects radially inwardly about the retainer lip inner radial end during installation within the gland and exerts a retention force radially outwardly against the gland inner circumferential surface.

18. A seal for sealing between a shaft and an outer member, the outer member being rotatable about a central axis extending through the shaft and having a bore, the shaft being disposed within the outer member bore and having an outer circumferential surface and a gland defined by two facing radial surfaces and a circumferential surface spaced radially inwardly from the outer circumferential surface, the seal comprising:
an annular body sized to be disposable within the gland and formed of a flexible material, the annular body having a main body portion with an inner radial end and an outer radial end, a primary sealing lip extending radially outwardly from the outer radial end of the main body portion such that an annular gap is defined radially between the primary sealing lip and the outer radial end of the main body portion and configured to sealingly engage with the outer member and a secondary sealing lip extending radially inwardly from the inner radial end of the main body portion such that an annular gap is defined radially between the secondary sealing lip and the inner radial end of the main body portion and configured to engage with the circumferential surface of the gland.

19. The seal as recited in claim 18, wherein:
the seal main body portion further has opposing first and second axial ends, the first axial end being disposed against the first radial surface of the gland;
the primary sealing lip has an inner radial end integrally formed with the seal main body portion and an outer radial end, the primary sealing lip having an outside diameter at the outer radial end greater than an inside diameter of the outer member bore such that the outer sealing lip deflects radially inwardly about the sealing lip inner radial end during installation within the outer member bore and exerts sealing pressure against the outer member; and
the secondary sealing lip has an outer radial end integrally formed with the seal main body portion, an inner radial end and an inside diameter at the inner radial end less than an outside diameter of the gland circumferential surface such that the secondary sealing lip deflects radially outwardly about the inner lip outer radial end during installation within the gland and exerts a sealing force radially inwardly against the gland circumferential surface.

\* \* \* \* \*